United States Patent [19]
Voegeli

[11] Patent Number: 5,483,403
[45] Date of Patent: Jan. 9, 1996

[54] THIN FILM MAGNETIC HEAD STRUCTURE HAVING TAPERED SIDE EDGES

[75] Inventor: Otto Voegeli, Morgan Hill, Calif.

[73] Assignee: International Business Machines Corporation, Armonk, N.Y.

[21] Appl. No.: 403,556

[22] Filed: Mar. 13, 1995

Related U.S. Application Data

[63] Continuation of Ser. No. 116,653, Sep. 2, 1993, abandoned.

[51] Int. Cl.⁶ .............................. G11B 5/33; G11B 5/147
[52] U.S. Cl. ................................... 360/113; 360/126
[58] Field of Search .................................. 360/113, 119, 360/126; 338/32 R; 324/252

[56] References Cited

U.S. PATENT DOCUMENTS

| | | | |
|---|---|---|---|
| 3,313,889 | 4/1967 | Machinski | 360/119 |
| 4,016,601 | 4/1977 | Lazzari | 360/122 |
| 4,386,383 | 5/1983 | Desserre et al. | 360/119 |
| 4,710,838 | 12/1987 | Jahnke | 360/119 |
| 4,713,708 | 12/1987 | Krounbi et al. | 360/113 |
| 5,018,037 | 5/1991 | Krounbi et al. | 360/113 |
| 5,137,750 | 8/1992 | Amin et al. | 360/119 |
| 5,291,363 | 3/1994 | Somers | 360/113 |

FOREIGN PATENT DOCUMENTS

| | | | |
|---|---|---|---|
| 59-16117 | 1/1984 | Japan | 360/126 |
| 0801057 | 1/1981 | U.S.S.R. | 360/119 |

Primary Examiner—John H. Wolff
Assistant Examiner—Brian E. Miller
Attorney, Agent, or Firm—Thomas R. Berthold

[57] ABSTRACT

A thin film magnetic structure for use as a flux guide in a magnetic recording system has tapered edges transverse to the magnetization axis of the film. The tapered edges eliminate magnetic edge domains and thereby assure a single magnetic domain in the film structure. Thus, Barkhausen noise is essentially eliminated from the signal read by the film structure from the magnetic recording medium.

4 Claims, 8 Drawing Sheets

THIN FILM MAGNETIC HEAD STRUCTURE HAVING TAPERED SIDE EDGES

This is a continuation of application Ser. No. 08/116,653 filed on Sep. 2, 1993, now abandoned.

TECHNICAL FIELD

This invention relates to a thin film magnetic structure for use as a magnetic flux guide.

DESCRIPTION OF THE PRIOR ART

Magnetoresistive (MR) sensors, which are responsive to changes in resistivity caused by the presence of magnetic fields, are used as read transducers in the heads of magnetic recording systems, such as disk drives. MR sensors operate on the basis of the anisotropic magnetoresistive effect in which a component of the MR sensor resistance varies as the square of the cosine ($COS^2$) of the angle between the magnetization of the sensor and the direction of sense current flow through the sensor.

In those magnetic recording systems where it is desirable or necessary to locate the MR sensor away from the magnetic recording medium, such as in contact or near-contact magnetic recording disk drives, a magnetic flux guide is used to direct the magnetic flux from the medium to the MR sensor.

The easy axis of magnetization of an MR sensor film is designed to be parallel to the recording medium so that magnetic fields oriented perpendicular to the medium will cause rotation of the magnetization axis of the MR sensor film and thereby a change in resistivity and corresponding MR sense current. In magnetic flux guides for MR sensors, the film structures are fabricated to have their easy axis of magnetization along a single direction; e.g., parallel to the magnetic recording medium from which the magnetic flux is to be sensed. One of the problems associated with such a structure is that at the edges of the film, in the direction generally transverse to the magnetization axis, magnetic edge domains are created. These domains are unstable in the presence of an applied magnetic field, such as the flux from a magnetic recording medium, and thus their response in the presence of the applied field is unpredictable. This movement of the edge domains in the presence of an applied field during the readback of data from a magnetic recording medium by the MR sensor creates what is known as Barkhausen noise. Thus, in order to eliminate Barkhausen noise, it is desirable to eliminate edge domains by having a single magnetic domain in films which make up the magnetic flux guides.

One known technique for reducing edge domains in magnetic flux guides is to laminate at least two magnetic films with a nonmagnetic intermediate spacer film. Each magnetic film has its magnetization lying in the easy axis direction, but superpositioned films have their magnetization directed antiparallel. Flux closure between the separated magnetic films in the laminate is through the spacer film near the edges and via external fringe fields at the side edges. The lamination does not totally eliminate the problem of edge domains and associated Barkhausen noise.

In another technique, as described in U.S. Pat. No. 5,032,945 assigned to IBM, the laminated film approach is used but the two magnetic films are formed to be closed at the edges. The edge closure acts as a magnetic short between the two magnetic films and results in a reduction of the effect of edge domains. The laminated film with tile two magnetic films closed at the edges is more difficult to fabricate than the conventional laminated magnetic flux guide.

Thus, what is needed is an improved thin film magnetic structure, in the form of a magnetic flux guide for an MR sensor, which eliminates the effects of edge domains and which is easy to fabricate using conventional thin film fabrication techniques.

SUMMARY OF THE INVENTION

The invention is a magnetic film structure that eliminates magnetic edge domains and their associated Barkhausen noise. In the preferred embodiment, the film structure has an easy axis of magnetization in a particular direction and tapered edges that are generally transverse to that axis. The reduction in film thickness toward the edges transverse to the film's magnetization eliminates edge domains and assures a single domain state in the film structure. The film structure is usable as a magnetic flux guide for an MR sensor.

The film structure is fabricated preferably by sputter deposition of the magnetic films and nonmagnetic spacer films of the laminated film structure, through a bilayer photoresist having undercuts which cause the edge portions of the film structure to be tapered.

With the use of the magnetic film structure according to the present invention, a magnetic recording system having a magnetic flux guide for the MR sensor has improved performance in reading back signals recorded on the medium.

For a fuller understanding of the nature and advantages of the present invention, reference should be made to the following detailed description taken in conjunction with the accompanying figures.

DETAILED DESCRIPTION OF THE PREFERRED EMBODIMENTS

Figure 1:
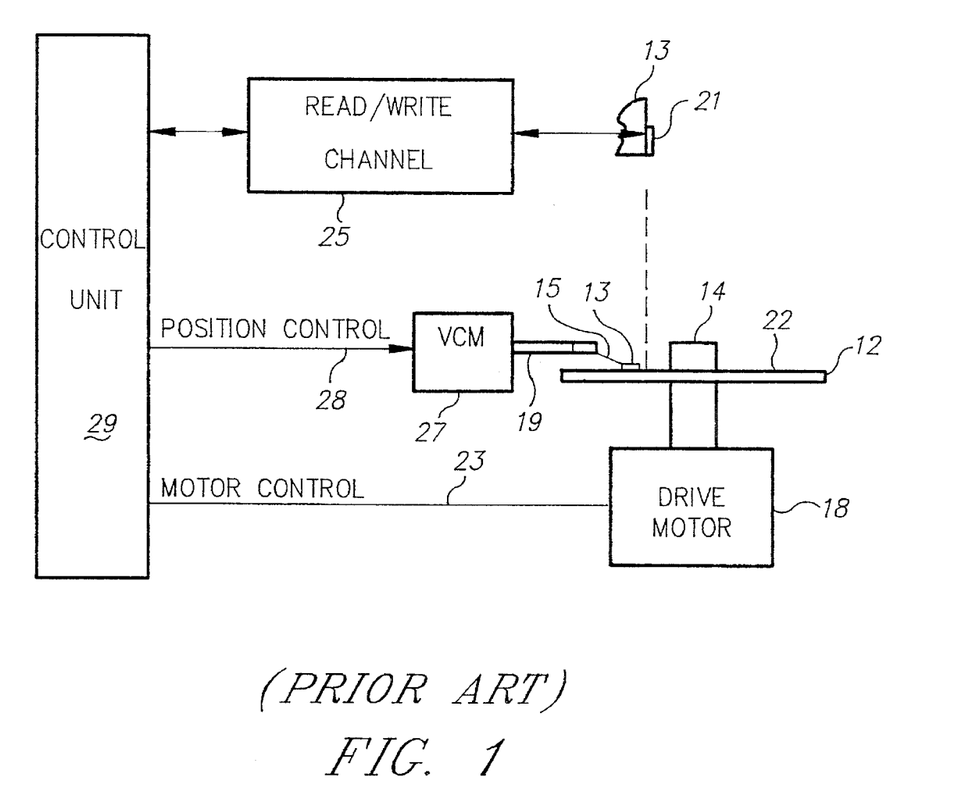
FIG. 1 is a block diagram of a conventional magnetic recording disk drive.

Referring now to FIG. 1, although the invention is described as embodied in a magnetic disk storage system as shown, it will be apparent that the invention is also applicable to other magnetic recording systems, such as a magnetic tape recording system, for example.

At least one rotatable magnetic disk 12 is supported on a spindle 14 and rotated by a disk drive motor 18. The magnetic recording media on each disk is in the form of an annular pattern of concentric data tracks (not shown) on disk 12.

At least one head carrier 13 is positioned on the disk 12, each carrier 13 supporting one or more magnetic transducers 21 for reading and/or writing data. The transducers are typically referred to as read/write heads. As the disks rotate, the carriers 13 are moved radially in and out over the disk surface 22 so that the heads 21 may access different portions of the disk where desired data is recorded. Each carrier 13 is attached to an actuator arm 19 by means of a suspension 15. The suspension 15 provides a slight spring force which biases the carrier 13 against the disk surface 22. Each actuator arm 19 is attached to an actuator means 27. The actuator means as shown in FIG. 1 may be a voice coil motor (VCM), for example. The VCM comprises a coil movable within a fixed magnetic field, the direction and velocity of the coil movements being controlled by the motor current signals supplied by a control unit 29.

In one type of disk drive, the rotation of the disk 12 generates an air bearing between the carrier 13 and the disk surface 22 which exerts an upward force or lift on the carrier 13. The air bearing thus counterbalances the slight spring force of the suspension 15 and supports the carrier 13 off and slightly above the disk surface by a small, substantially constant spacing during operation. The present invention is also applicable to other types of disk drives, however, such as contact or near-contact recording disk drives, wherein the head carrier is urged into contact with the disk during read and write operations. Examples of such disk drives are described in U.S. Pat. No. 4,819,091; 5,097,368; and 5,202,803.

The various components of the disk storage system are controlled in operation by control signals generated by control unit 29, such as access control signals and internal clock signals. Typically, the control unit 29 comprises logic control circuits, storage means, and a microprocessor, for example. The control unit 29 generates control signals to control various system operations, such as drive motor control signals on line 23 and head position and seek control signals on line 28. The control signals on line 28 provide the desired current profiles to optimally move and position a selected carrier 13 to the desired data track on the associated disk 12. Read and write signals are communicated to and from read/write heads 21 by means of the read/write channel 25. When the read/write head 21 includes an MR sensor for reading data from disk 12, a current source (not shown) is used to apply a bias current to the MR sensor, and the read/write channel 25 includes MR signal amplification and detection circuitry.

The above description of a typical magnetic disk storage system, and the accompanying illustration of FIG. 1, are for representation purposes only. It should be apparent that disk storage systems may contain a large number of disks and actuators, and each actuator may support a number of head carriers.

Figure 2:
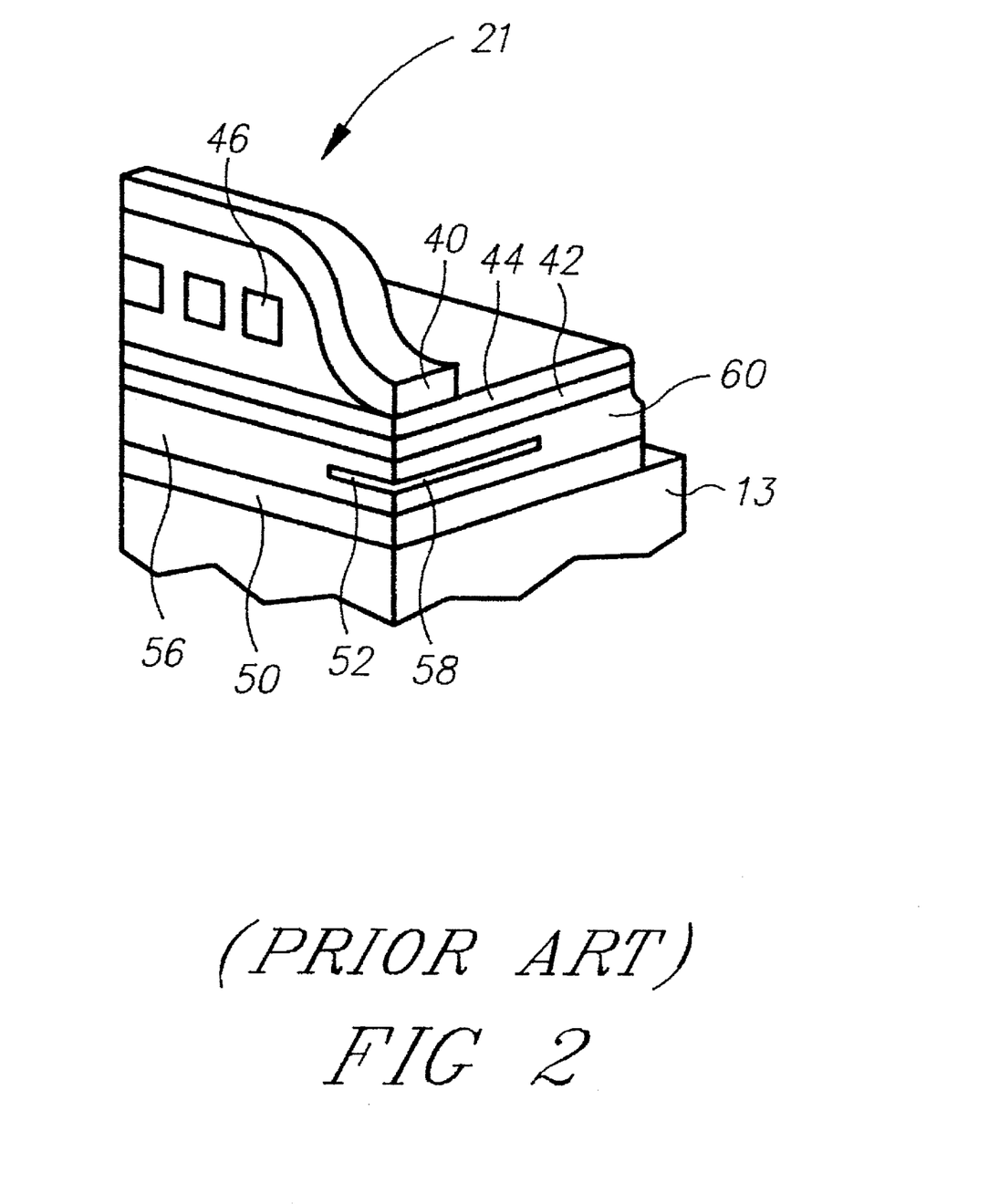
FIG. 2 is a sectional view of a magnetic recording read/write head usable with the disk drive of FIG. 1.

Referring now to FIG. 2, the read/write head 21 formed on carrier 13 is shown in sectional view to illustrate the films making up the structure. The basic head design consists of separate read and write structures formed over each other and sharing some common elements. The write structure is a thin film inductive head comprising pole tips 40, 42 which define a write gap 44. The copper coils 46 making up the inductive write head are shown in sectional view between the pole pieces 40, 42. A first MR shield 50 is deposited on an oxide film grown on the substrate surface of carrier 13. The inductive pole piece 42 also serves as a second MR shield. MR shields 42, 50 are spaced apart from the MR sensor 52, which is located in the middle of gap material 56 between the two shields. The MR sensor 52 has a sensing end 58 which is aligned generally parallel with the surface of the magnetic recording medium. As shown in FIG. 2, one end of MR sensor film 52 has a lead 60 attached to it. Since FIG. 2 is a sectional view showing the interior of the read/write head 21, the opposite half of sensor film 52 and its associated electrical lead is not shown. The electrical leads are connected to the current source to supply a bias current through sensor film 52 and to detect changes in resistance corresponding to changes in magnetic flux from the magnetic recording disk.

Figure 3:
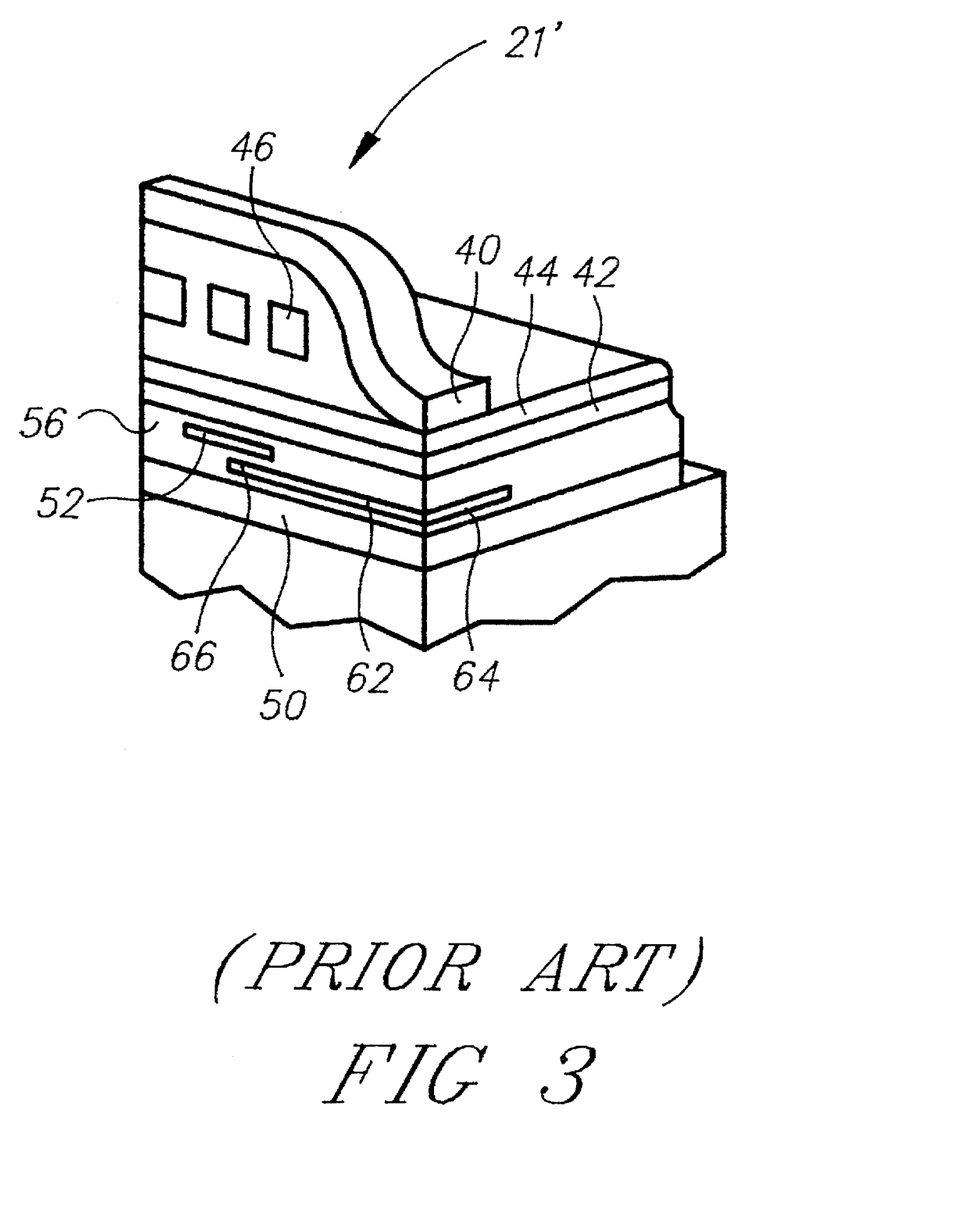
FIG. 3 is a sectional view of a magnetic recording read/write head having a recessed MR sensor and a magnetic flux guide usable with the disk drive of FIG. 1.

Referring now to FIG. 3, there is shown an embodiment of a read/write head denoted as 21', which is similar to the read/write head depicted in FIG. 2, but where MR sensor film 52 is recessed from the end of head 21' which faces the disk surface. A magnetic flux guide 62 has a sensing end 64 which faces the disk surface and another end 66 which is magnetically coupled to MR sensor 52. MR sensor 52 and the end 66 of magnetic flux guide 62 are separated by a portion of the gap material 56. In both the MR sensor 52 and the magnetic flux guide 62, the easy axis of magnetization is oriented parallel to the disk surface; i.e., parallel to the sensing end 64 of flux guide 62.

Figure 4:
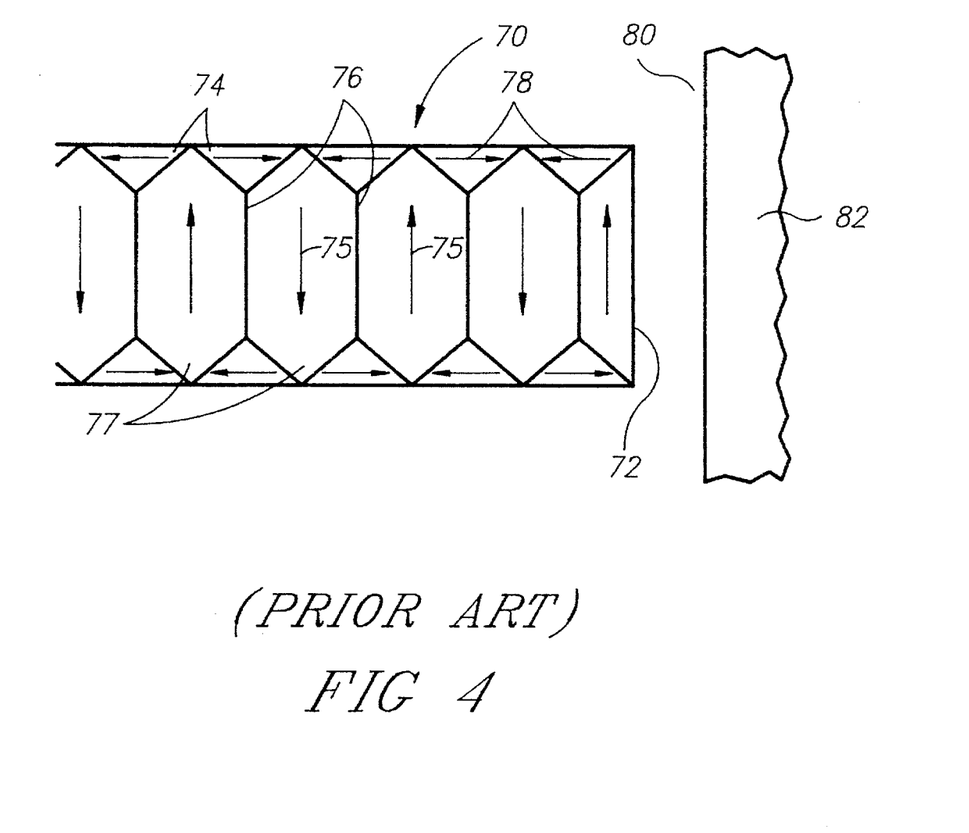
FIG. 4 is a schematic representation of magnetic domains in a prior art magnetic film structure located near a magnetic recording disk.

The problem of edge domains in magnetic flux guides is depicted schematically in FIG. 4, which illustrates a thin film magnetic structure 70. Structure 70 may be a magnetic flux guide for an MR sensor with its sensing end 72 oriented toward the surface 80 of a disk 82. Triangular magnetic domains 74 formed along the side edges of structure 70 are edge domains that form in order to minimize the total magnetic energy associated with the magnetic film. The structure 70 has its easy axis of magnetization aligned parallel to the magnetization arrows 75 and parallel to the sensing end 72, which is parallel to the surface 80 of disk 82 that contains the magnetically recorded data. The domain walls 76 define the central domains 77. The arrows 78 indicate the magnetic vectors for the edge domains. It is these magnetic edge domains 74 which are essentially unstable in the presence of a magnetic field arising from disk 82, and which prevent the magnetic film structure 70 from having the desired single magnetic domain.

Figure 5:
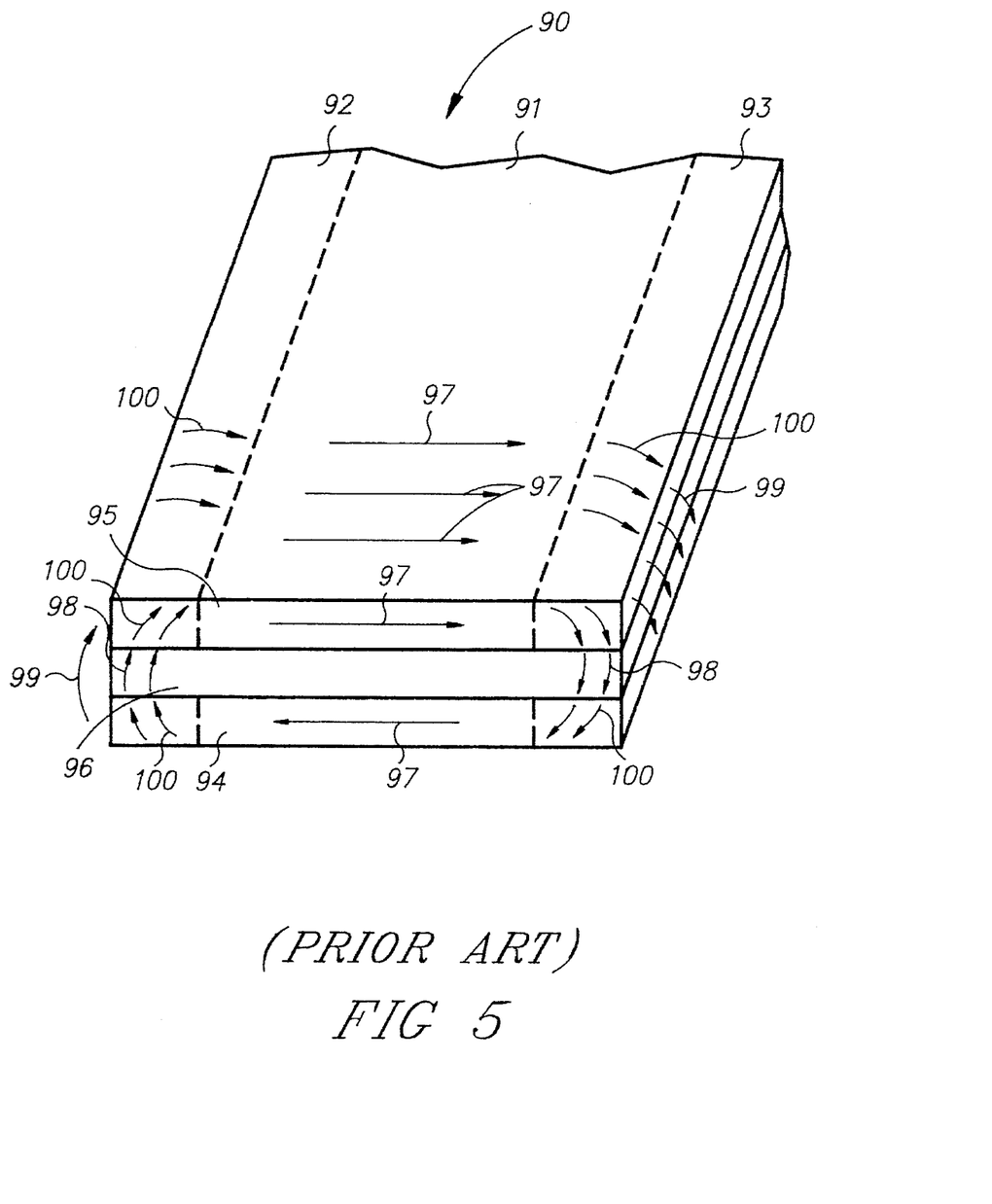
FIG. 5 is a schematic representation of magnetic domains in a prior art laminated magnetic flux guide.

Referring now to FIG. 5, there is illustrated the prior art laminated film structure 90 for use as a laminated magnetic flux guide. The thin film structure 90 is a laminated layer having a central region 91 and edge regions 92, 93. The laminated structure has two magnetic films 94, 95 which are separated by a nonmagnetic spacer film 96. The magnetization of the central region 91 of each of the magnetic films 94, 95 is in the direction as represented by arrows 97, with the flux loop being closed through the spacer film 96 near the edges (arrows 98) and through external fringe fields (arrow 99). In the edge regions 92, 93 the edge domains, as represented by arrows 100, are not completely eliminated unless the magnetic films 94, 95 and the spacer film 96 are extremely thin, too thin for the structure to be useful as a flux guide.

Figure 6:
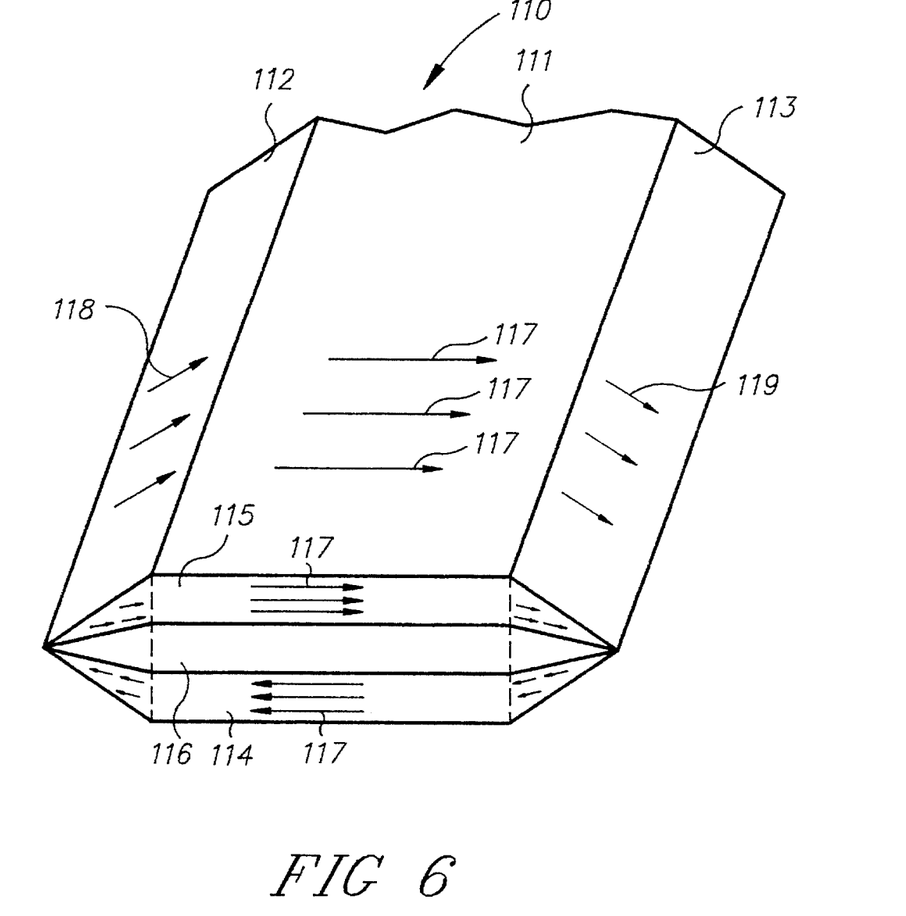
FIG. 6 is a schematic representation of magnetic domains in the laminated magnetic flux guide of the present invention.

Referring now to FIG. 6, a schematic diagram of the magnetic film structure according to the present invention is illustrated. In the embodiment shown in FIG. 6, the structure 110 is a laminated structure for use as a magnetic flux guide and having magnetic films 114, 115 separated by a nonmagnetic spacer film 116. The film structure 110 has a central region 111 in which its magnetization 117 is oriented parallel to the medium (not shown) containing the magnetically recorded data. The film structure 110 has edge regions 112, 113 located on the edges generally transverse to the magnetization axis 117. The magnetic films 114, 115 and spacer film 116 decrease in thickness toward the edges 112, 113. As shown in FIG. 6, the central region 111 has an essentially uniform thickness and tile edge regions 112, 113 have their magnetic films 114, 115 and spacer film 116 tapered toward the edges of the laminated film structure. As depicted by the arrows 118, 119 in the respective edge regions 112, 113, as the amount of magnetic material in the film decreases in the direction of the tapers, the strength of the magnetization decreases. Thus, the structure shown in FIG. 6 achieves parallel flux decay near the edges 112, 113 while retaining a magnetization in the edge regions which is aligned parallel with the magnetization 117. In contrast, the prior art laminated structure of FIG. 5 still produces longitudinal flux components, nonparallel to the film's magnetization axis, which are of undetermined polarity and which thus give rise to an uncontrolled response of the magnetization in the film structure.

Figure 7:
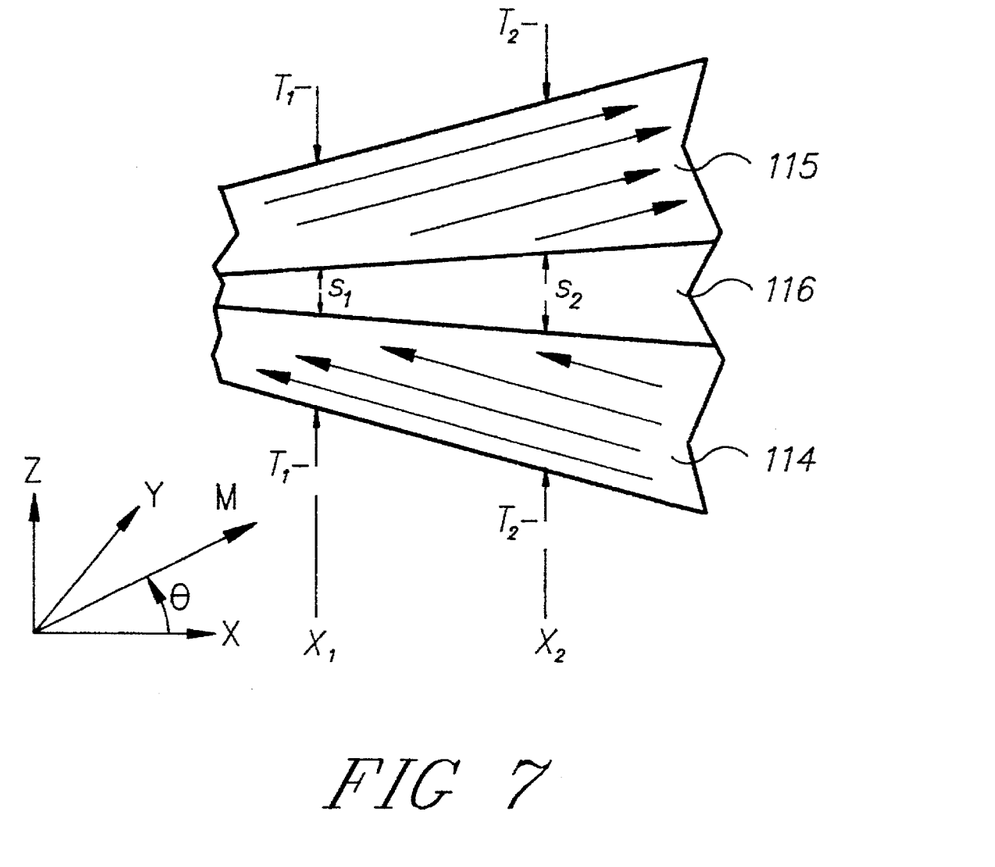
FIG. 7 is a schematic representation of magnetic flux in a portion of a tapered edge region of the magnetic flux guide of FIG. 6.

The elimination of edge domains in the structure 110 of FIG. 6 according to the present invention is obtained by reducing the film thickness toward those edges which are generally transverse to the easy magnetization axis of the film. The amount of tapering desired to achieve tile elimination of the edge domains can be estimated according to the following explanation and with reference to FIG. 7, which is an end view of a portion of the tapered edge 112 of structure 110.

Assume that tile thickness of magnetic films 114, 115 is represented by thicknesses $T_1$ and $T_2$ at locations $x_2$, and $x_2$, respectively, along the tapered edge of the structure 110 in FIG. 5, and that the thickness of nonmagnetic spacer film 116 is also represented by thicknesses $S_1$ and $S_2$ at locations $x_1$ and $x_2$. The magnetization lies in the X-Y plane; i.e., the plane of the magnetic film structure 110, and is free to rotate through an azimuthal angle $\theta$ in the X-Y plane. There is an induced easy axis of anisotropy along the X axis which tries to keep the magnetization transverse to edge regions 112, 113 (FIG. 6). The counterforce is the magnetostatic energy associated with the demagnetizing field arising from the flux divergences at the edges 112, 113 (FIG. 6). This force tries to rotate the magnetization into a longitudinal orientation (perpendicular to arrows 117 in FIG. 6). With the structure of the present invention, the objective is to spread the demagnetizing field such that the anisotropy energy dominates everywhere over the magnetostatic energy. This spreading is done by having the thickness of the film tapering off toward the edges. The shape of the taper needed to produce this effect is obtained by considering the sum of magnetostatic and anisotropy energy as a function of azimuthal orientation $\theta$ of the magnetization M in the X-Y plane.

With positions $x_1$ and $x_2$, we have per unit length in the y-direction an anisotropy energy $E_k$ given by:

$$E_k = (T_2 + T_1)(x_2 - x_1) \times K \sin^2 \theta \quad (1)$$

where K is the anisotropy energy density. The magnetostatic energy $E_m$ is given by:

$$E_m = \frac{1}{4}(S_2 + S_1)(x_2 - x_1) \times H_d^2 \quad (2)$$

where $H_d$, the demagnetizing field in the spacer, is given by:

$$H_d = \frac{(T_2 - T_1)}{(x_2 - x_1)} \times 4\pi M_s \cos \theta \quad (3)$$

To find the stable azimuthal angle, we set $$\frac{\partial}{\partial \theta}(E_k + E_d) = 0,$$

which happens when $\sin \theta = 0$ and $\cos \theta = 0$, or when $$K - \frac{(4\pi M_s)^2}{4} \times \frac{(T_2 - T_1)^2}{(x_2 - 2_1)^2} \times \frac{(S_2 + S_1)}{(T_2 + T_1)} = 0 \quad (4)$$

To identify the stable solution, we set $$\frac{\partial^2}{\partial \theta^2}(E_k + E_d) \geqq = 0,$$

which for the wanted orientation, $\sin \theta = 0$ occurs when the left side of (4) is positive, or in differential form when $$\frac{dT}{dx} \leqq \frac{1}{2\pi} \sqrt{\frac{TH_k}{2SM_s}} \quad (5)$$

where the anistrophy field $$H_k = 2 \frac{K}{M_s}$$

is the induced and/or magnetostrictive anisotropy. So, (5) gives the minimal taper required to retain M along the direction transverse to the edges. This taper is a function of the film's saturation magnetization, $M_s$, the anisotropy field $H_k$, and the thickness ratio T/S between the magnetic films 114, 115 and the spacer film 116 in the nontapered central region 111. Assuming typical values of $H_k = 8$ $O_e$ and $M_s = 800$ Gauss, slopes or tapers of 0.01, 0.04 and 0.1 for T/S ratios of 1, 10, and 100, respectively, are obtained. For example, using magnetic films 0.1 micron thick, a spacer 0.01 micron thick necessitates a minimal taper length of about 1 micron. This length can be arbitrarily shortened by fabricating the guide from several pairs of thinner films.

FIG. 6 is essentially a schematic representation showing how the structure of the laminated flux guide results in the elimination of edge domains. The following description of the fabrication process will explain the use of a bilayer photoresist with undercuts to form a continuous structure with gradually tapering edges, resulting in a film structure having no edge domains.

Figure 8:
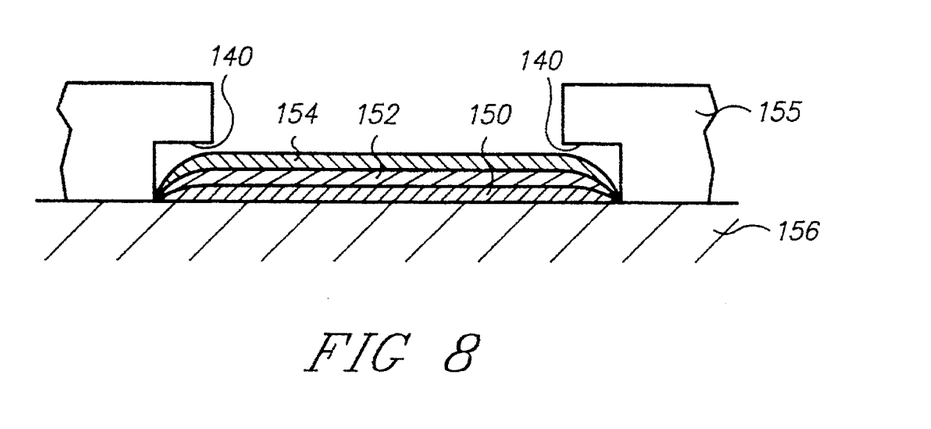
FIG. 8 is a sectional view of the laminated flux guide of the present invention during its fabrication step.

The method of fabricating the laminated flux guide according to the present invention will now be illustrated with respect to FIG. 8. FIG. 8 illustrates the method for forming just the magnetic flux guide portion of the complete head assembly, such as flux guide 62 of head assembly 21' (FIG. 3). A layer 155 of conventional bilayer photoresist is patterned over a substrate 156, which is typically a portion of gap material. FIG. 8 represents the cross-sectional view of the photoresist 155 after exposure and dissolving of the exposed photoresist, and illustrates undercut regions 140 which will permit the subsequent formation of the tapered edges of the magnetic film structure. The three layers, magnetic films 150, 154 and intermediate nonmagnetic spacer film 152, are all sputter deposited through bilayer photoresist 155 onto substrate 156. The undercut regions 140 cause the laminated films 50, 152, 154 to have a gradually decreasing thickness toward their edges, which results in essentially tapered edges. In the preferred embodiment, the magnetic films 150, 154 may be formed of permalloy and the nonmagnetic spacer film 152 formed of aluminum.

The magnetic film structure utilizing the present invention in the form of a laminated magnetic flux guide (as shown in FIG. 6) Call be used with an MR sensor film and incorporated into a magnetic read/write head structure of the type shown in FIG. 3. The result is the elimination of edge domains in the flux guide, which enables a head assembly to function with a recessed MR sensor without Barkhausen noise.

While the preferred embodiments of the present invention have been illustrated in detail, it should be apparent that modifications and improvements may be made to the invention without departing from the spirit and scope of the invention as described in the following claims.

What is claimed is:

1. A head assembly for use in a magnetic recording disk drive having a disk for the recording of data comprising:
    a carrier having a surface facing the disk when the carrier is located in the disk drive; and
    a head formed on the carrier, the head comprising:
        a magnetoresistive sensor recessed from the disk-facing surface of the carrier, and
        a magnetic flux guide for directing magnetic flux from the disk to the sensor comprising a laminate of two magnetic films and a nonmagnetic spacer film located between the two magnetic films, the flux guide having a thickness defined by the thickness of the laminated films, a length defined between a sensing end near the disk-facing surface on the carrier and an opposite end magnetically coupled to the recessed sensor, and a width near the sensing end defined between two side edges, the width having a central region and two edge regions spaced apart by the central region, the magnetic films having their magnetization oriented generally parallel to the sensing end and generally perpendicular to each of said two side edges, each of the two magnetic films and intermediate spacer film having a thickness that is generally constant over a substantial portion of the width of the sensing end in the central region of the sensing end, that decreases toward each of said two side edges in each of the edge regions, and that is at its minimum at said side edges; wherein a single domain state in the flux guide of the head assembly is obtained.

2. The head assembly according to claim 1 further comprising an inductive write head formed on the carrier.

3. A magnetic recording system of the type having a magnetic recording medium and a magnetoresistive sensor for reading data recorded on the medium, the system comprising:
    a carrier for supporting the magnetoresistive sensor near the medium;
    a magnetoresistive sensor located on the carrier and recessed from that portion of the carrier near the medium;
    a magnetic flux guide having a sensing end near the medium, its other end magnetically coupled to the recessed magnetoresistive sensor for directing magnetic flux from the medium to the magnetoresistive sensor, two spaced-apart side edges defining the width of the flux guide, the width encompassing a central region and two edge regions, the flux guide comprising a laminate of two generally flat magnetic films and a generally flat intermediate nonmagnetic spacer film, the magnetic films having their magnetization oriented generally parallel to the sensing end and generally perpendicular to said side edges, each of the films having a thickness that is generally constant across a substantial portion of the width of the flux guide in the central region between said side edges, that decreases toward said side edges, in the two edge regions, and that is at its minimum at said side edges wherein a single domain state in the flux guide is obtained;
    means for moving the medium and the carrier relative to one another; and
    means electrically coupled to the magnetoresistive sensor for detecting changes in electrical resistance of the sensor representative of magnetic flux directed to the magnetoresistive sensor from the medium by the flux guide.

4. The magnetic recording system according to claim 3 further comprising an inductive write head formed on the carrier.

* * * * *